Dec. 24, 1957   O. H. BANKER   2,817,425
CHANGE SPEED TRANSMISSION AND CONTROLS THEREFOR
Filed March 25, 1954   7 Sheets-Sheet 1

Fig. 1    Fig. 1a

INVENTOR.
Oscar H. Banker
BY
Charles V. Vytech
Att'y

Dec. 24, 1957 O. H. BANKER 2,817,425
CHANGE SPEED TRANSMISSION AND CONTROLS THEREFOR
Filed March 25, 1954 7 Sheets-Sheet 4

INVENTOR.
Oscar H. Banker
BY

Dec. 24, 1957 O. H. BANKER 2,817,425
CHANGE SPEED TRANSMISSION AND CONTROLS THEREFOR
Filed March 25, 1954 7 Sheets-Sheet 5

INVENTOR.
Oscar H. Banker
BY
Charles P. Vogtech
Att'y

Fig. 8

United States Patent Office 2,817,425
Patented Dec. 24, 1957

2,817,425

CHANGE SPEED TRANSMISSION AND CONTROLS THEREFOR

Oscar H. Banker, Evanston, Ill., assignor to New Products Corporation, Chicago, Ill., a corporation of Delaware Application March 25, 1954, Serial No. 418,547

28 Claims. (Cl. 192—3.5)

This invention relates to improvements in change speed power transmitting mechanisms for automotive vehicles and to a control mechanism for a semi-automatic power transmitting device of the step type. For purposes of illustration this invention will be described with reference to its application to a change speed transmission of the countershaft type having four forward speeds, neutral and a reverse speed, and having a friction clutch for connecting the input end of the transmission to the engine or other source of power.

The transmission to which this invention is particularly adaptable is one wherein changes in speed ratio through the transmission are effected by means of jaw clutches, the clutches being provided with means for preventing a shift into engagement of the clutch until there is a relative reversal of direction of rotation of the driving and driven elements of the clutch. In the form chosen for illustration, the jaw clutch is of the Maybach type, that is, a clutch wherein the ends of the teeth are chamfered so that an attempted engagement while there is relative rotation in one direction is prevented by a ratcheting of the ends of the teeth upon one another. This invention may likewise be applied, however, to jaw clutches of the ordinary type which are equipped with blocker type synchronizers which function in precisely the same manner as the Maybach clutch in that engagement of the driving and driven elements of the jaw clutch is prevented until a relative reversal in the direction of rotation of the two elements of the clutch is effected whereby the blocker is rotated out of the way of the movable element of the clutch to permit the movable element to engage the axially stationary element thereof.

In the transmission contemplated by this invention, two Maybach type clutches are employed to provide four forward speeds through the transmission, including a direct drive. The movement of the clutches into engagement is controlled by a speed responsive governor which is rotated in timed relation with the output shaft of the transmission, and is effected by springs which, however, are rendered inoperative at the appropriate times by hydraulic pistons controlled by the governor. Since the engagement of the jaw clutches is dependent upon a relative reversal in the direction of drive as between the driving and driven elements of each clutch, it is necessary to slow down the driving element of each clutch below the speed of the driven element which, being connected to the load, tends to continue its rotation under the forces of inertia. In order to reduce the shifting time of the clutches, a brake is applied to the driving element of each clutch, said brake being operated in timed relation with the operation of a clutch so that it is released automatically when the clutch is engaged whereby to permit a resumption of the drive through the transmission.

One of the objects of this invention, therefore, is to provide, in a semi-automatic transmission of the type above described, a hydraulic control system for the jaw clutches and the speed reducing brake which is simple in its operation and construction, is positive in its action, and which insures the correct sequence of operations to avoid damage to the controls and to the transmission.

It is likewise a characteristic of the jaw type of clutch that it cannot readily be disengaged so long as torque is being transmitted through it. A common expedient used to effect a disengagement of a jaw clutch while the operator continues to impress a torque on the input shaft, is to provide means for momentarily interrupting the torque as an adjunct to some other operation performed by the operator. For example, where the transmission is arranged to transmit power from an internal combustion engine having an electrical ignition system and a throttle or accelerator pedal for controlling the supply of fuel to the engine, automatic means have been provided for momentarily interrupting the ignition circuit so that the engine will miss one or two explosions, and during this brief interval of torque relief the clutch may be disengaged.

It is another object of this invention to provide a simplified ignition interrupting system for a change speed power transmitting device using jaw clutches for effecting a change in speed ratio through the device, said ignition interrupting means being operable when it is desired to disengage either one of two jaw clutches used in the transmission.

One of the requirements of an automatic change speed transmission to be used to transmit power from an engine to the rear wheels of an automotive vehicle is that the transmission be capable of transmitting power in a reverse direction from the rear wheels to the engine so that the engine may be started by towing or pushing the vehicle.

A still further object of this invention therefore is to provide a simplified apparatus for starting the engine of an automotive vehicle by reversing the drive through the change speed transmission thereof wherein the transmission utilizes jaw type clutches for effecting changes in speed therethrough, said clutches nevertheless being controlled by fluid pressure, and wherein a centrifugal engine clutch is utilized to connect the engine to the transmission, said reverse direction drive including means for engaging the engine clutch to complete the drive to the engine.

As another object, this invention seeks to provide, in a change speed transmission of the step type using positive clutches for effecting changes in speed ratio, a mechanical centrifugally operated friction clutch for connecting the engine to the input shaft of the transmission, with means for locking the clutch in engagement upon the attainment of a predetermined speed of rotation of the driven shaft of the transmission.

As a further object, this invention seeks to provide a centrifugally operated friction clutch for use with a step type transmission using free wheeling clutches for releasing one speed ratio upon the establishment of a higher speed ratio, with means for locking the friction clutch in engagement independently of the force developed in the centrifugally operating means for the clutch, said locking means being available in conjunction with the locking up of one of the overrunning clutches in the transmission to provide a reverse direction drive through the transmission and clutch from the driven shaft to the driving shaft in order to provide a means for starting an engine connected to the friction clutch when the transmission and engine are used in an automotive vehicle.

A feature of this invention is the provision of a hydraulic control system for a step type countershaft type change speed transmission utilizing jaw clutches as the speed ratio changing elements, wherein the source of fluid under pressure for the fluid system is incorporated in the transmission so as to make the transmission substantially self-contained.

Another feature of this invention is the provision of a source of fluid under pressure for operating certain mechanisms in a countershaft type transmission, wherein the drive for the source is taken from an element of the transmission which is constrained to rotate whenever the countershaft elements of the transmission rotate.

A still further feature of this invention is provision of a step type change speed transmission for an automotive vehicle, said transmission being driven by a centrifugally operated friction clutch connected to the engine for the vehicle, wherein purely mechanical means are used to effect a driving connection between the clutch and the driven shaft of the transmission to start the vehicle in motion, and hydraulic means are used to control changes in speed ratio from the starting ratio to the highest available in the transmission.

Yet another feature of this invention is the provision of manual means for controlling the speed at which a centrifugally operable clutch will engage.

These and other objects and features of this invention will become apparent from the following detailed description when taken together with the accompanying drawings in which:

Fig. 9 is a wiring diagram of the electrical apparatus used in this transmission.

Figures 1, 1A:
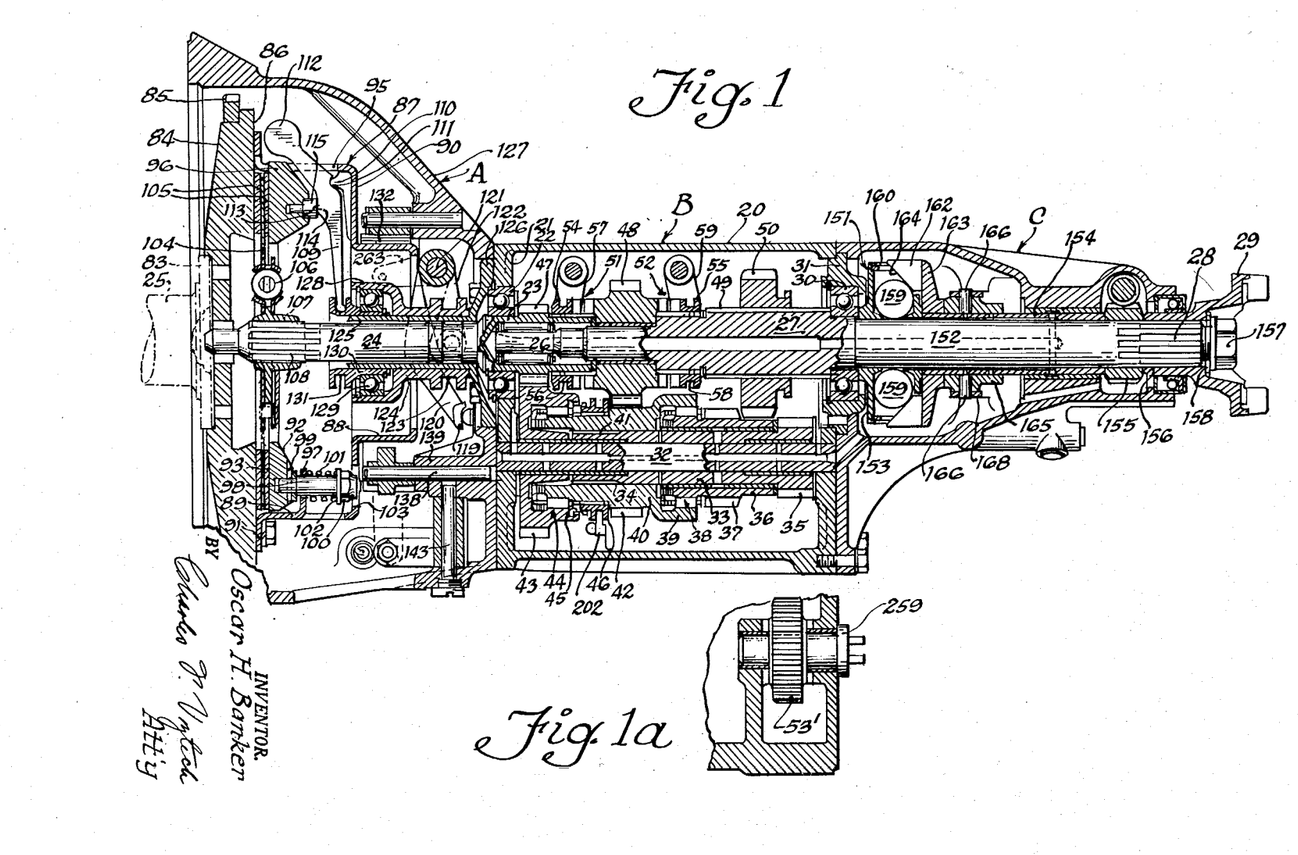
Fig. 1 is a side elevational view in section of a step type transmission to which this invention is applicable, together with an automatic centrifugally operated engine clutch and fragments of the controls for the transmission.
Fig. 1a is a fragmentary sectional view of an idler gear used in the transmission of Fig. 1.

Referring now to Fig. 1, the transmission may be divided for convenience of assembly into three sections, namely, section A which houses the automatic friction clutch for connecting the transmission to the crank shaft of an automotive internal combustion engine and also the engine brake, section B which houses the gearing and jaw clutches for effecting a plurality of speed ratios through the transmission, and section C which houses the governor for the transmission and the speedometer drive.

The description will be facilitated by considering first section B, followed by descriptions of section A and section C.

The gear trains

Section B is comprised of a housing 20 having a front wall 21 in which is mounted an anti-friction bearing 22. Said bearing 22 supports the enlarged end 23 of an input or drive receiving shaft 24 which extends into section A and is piloted at its left hand end as viewed in Fig. 1 in the end of the crankshaft 25 of an internal combustion engine (not shown). Enlarged end 23 is hollow to receive and support the front end 26 of the output shaft 27 which extends through section B and also to the right of section B, as viewed in Fig. 1, through section C to terminate in splines 28. The driving yoke 29 of a universal joint which receives the output of the transmission is formed with internal splines to engage the splines 28 on shaft 27 so as to be driven thereby. An anti-friction bearing 30 supports the central region of shaft 27 from a transverse closure plate 31 mounted in housing 20. It is understood that output shaft 27 is free to rotate relative to input shaft 24 in so far as the description thus far given is concerned.

A counershaft 32 is mounted in housing 20 below and parallel with shaft 27. A long sleeve 33 is mounted for free rotation on countershaft 32, said sleeve 33 being formed with external splines 34 at its left hand end as viewed in Fig. 1 and with a gear 35 at its right hand end. Said sleeve 33 in turn supports for free rotation thereon a second sleeve 36 on which is formed a gear 37 substantially midway between the ends thereof, and the cam or driven portion of a roller-type one-way clutch 38. The driving portion of said clutch 38 is formed on the interior of the belled end 39 of a third sleeve 40 which is likewise supported on sleeve 33, but which is provided with internal splines 41 to engage external splines 34 on said sleeve to provide a positive drive therebetween. A gear 42 is formed on sleeve 40 adjacent belled end 39 thereof.

Also mounted for free rotation relative to countershaft 32 is a gear 43 which may be connected to drive sleeve 40 through a one-way roller type clutch 44, and may also be connected to drive sleeve 40 in either direction through a jaw clutch 45, the movable portion of which is in the form of a collar 46 which is splined to sleeve 40. One-way clutch 44 is arranged to drive sleeve 40 when gear 43 tends to rotate faster than sleeve 40, and one-way clutch 38 is arranged to drive the second sleeve 36 when gear 42 tends to rotate faster than gear 37. Jaw clutch 45 is engaged when it is desired to render inoperative one-way clutch 44, and clutch 45, therefore, is sometimes hereinafter referred to as a lock-up clutch for clutch 44.

The enlarged end 23 of input shaft 24 has formed thereon a gear 47 which constitutes the input gear for the transmission and which is constantly in mesh with gear 43 on countershaft 32. A gear 48, constantly in mesh with gear 42 on sleeve 40, is mounted on output shaft 27 and is free to rotate relative thereto. Shaft 37 is enlarged near bearing 30 and formed with external splines 49 on which is axially slidable a gear 50. Said gear 50 may be slid to the left as viewed in Fig. 1 into engagement with gear 37 for all forward speeds through the transmission, or it may be slid to the central position shown in Fig. 1 wherein it is not connected to any gear and consequently constitutes a neutral position to prevent any drive from being transmitted from shaft 24 through either gear 37 or 35 to shaft 27, and it may be slid to the right where it will be in axial alignment with gear 35 but will contact a reverse idler 53' shown in Fig. 1a, said idler in turn being in constant mesh with gear 35 on sleeve 33.

Jaw clutches 51 and 52 are provided for connecting gear 48 to shaft 24 and to shaft 27, respectively. These jaw clutches are of the Maybach type such as are shown in my United States Patent No. 2,353,137, dated July 11, 1944, and hence will not be described in detail here. Suffice it to say that these clutches are provided with teeth the ends of which are chamfered in such a direction that when shaft 24 rotates faster than gear 48 and it is attempted to engage the clutch 51, such engagement will not be effected but will be prevented until shaft 24 reverses its direction of drive relative to gear 48. Similarly, the ends of the teeth of clutch 52 are chamfered in such a direction that engagement of the clutch will be prevented so long as gear 48 rotates faster than shaft 27.

The relative sizes of the gears in section B are so selected that the gears may be meshed in combinations to give four progressively higher speed ratios between shafts 24 and 27 in a forward direction of drive and one reverse speed ratio. These ratios are as follows:

For all forward speeds, gear 50 is shifted to the left as viewed in Fig. 1 into engagement with gear 37. The first, or lowest, speed is then from gear 47 to gear 43, through one-way clutch 44 to sleeve 40, thence through one-way clutch 38 to sleeve 36 and gear 37, and finally from gear 37 through gear 50 to shaft 27. During the first speed ratio drive, clutches 51 and 52 are disengaged.

For the next higher ratio, i. e., second speed clutch, 52 is engaged so that the gear train then includes gear 47, gear 43, one-way clutch 44, sleeve 40 and its gear 42, gear 48 and clutch 52 to shaft 27. Although gear 37 in this speed ratio is still in mesh with gear 50, gear 37 will rotate faster than gear 42 and the train is broken by the over-running clutch 38.

The third speed is effected by disconnecting clutch 52 and connecting clutch 51. The power train is then from shaft 24 through clutch 51 to gear 48, then to gear 42 and through one-way clutch 38 to gear 37, from which the drive is then transmitted to gear 50 and shaft 27. In this third speed, over-running clutch 44 will break the drive from gear 43 to sleeve 40 to permit gear 42 to rotate faster than gear 43.

For direct drive, both clutches 51 and 52 are connected. The power train in direct drive is from shaft 24 through clutch 51 and the body of gear 48 to clutch 52 which, in turn, is connected directly to shaft 27 so that shaft 27 then rotates at the same speed as shaft 24 to provide a direct drive therebetween. In direct drive, both one-way clutches 38 and 44 will be over-running or "free-wheeling" to enable gear 37 to rotate faster than gear 42 and to enable gear 42 to rotate faster than gear 43.

For reverse drive, gear 50 is slid to the right, as viewed in Fig. 1, into engagement with idler gear 53', and the drive is then from gear 47 to gear 43 through overrunning clutch 44 to sleeve 40, and then through the splines 41, 34 to sleeve 33 and to gear 35 thereon. Gear 35 is in constant mesh with reverse idler 53' which, in turn, is now in mesh with sliding gear 50 connected to rotate with shaft 27, and because of the interposition of the idler 53' in the train, gear 50 will rotate in a reverse direction from that of drive shaft 24.

*The controls for the transmission*

Certain functions of the transmission are controlled manually and other functions are controlled automatically with a certain amount of manual over-control. The manually controlled functions will now be described:

The selection of the direction of drive is controlled manually. It is a requirement of present-day automotive vehicles that the transmissions for such vehicles be capable of transmitting a drive in a reverse direction, i. e., from the driven shaft of the transmission to the driving shaft, in a gear ratio corresponding to the second speed. Since such a drive in a reverse direction would normally be impossible in the present transmission because of overrunning clutch 44 which is serially connected in the drive, it is necessary to operate clutch 45 to lock up the over-running clutch to permit a transmission of drive from the driven shaft to the driving shaft through sleeve 40 and gear 43. This second speed lock-up operation is also controlled manually. Since the vehicle, however, may attain a speed in a locked-up second speed which is sufficiently great to cause the next higher speed ratio to become, or tend to become, effective automatically under the operation of the automatic controls to be hereinafter described, it is necessary, in addition to operating clutch 45 to lock up the over-running clutch 44, to insure the prevention of the operation of clutch 51. This latter function is performed manually as an adjunct to the operation of clutch 45 in the manner hereinafter to be described.

Figure 2:
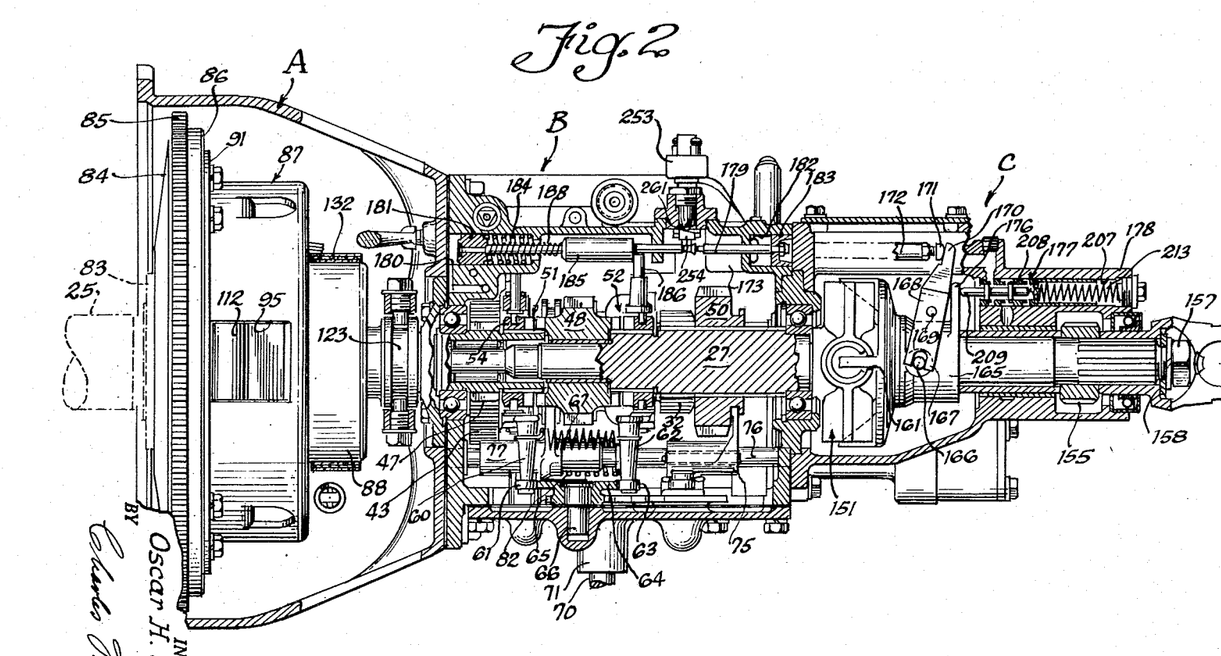
Fig. 2 is a plan view in section of the transmission of Fig. 1 showing further details of the controls for the transmission.
Figure 7:
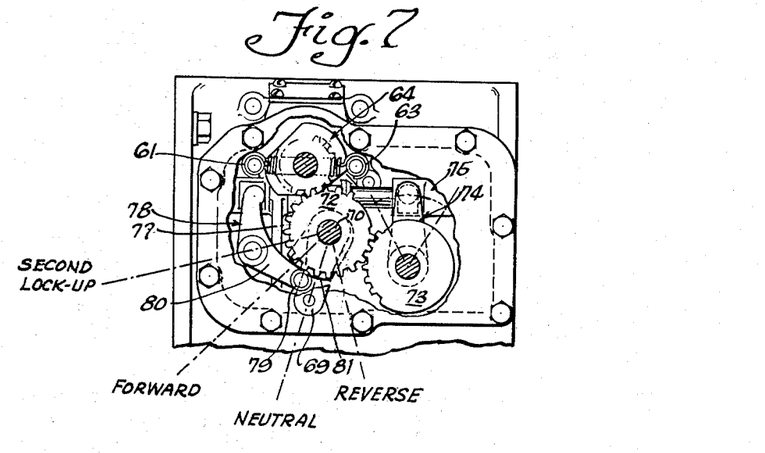
Fig. 7 is a side elevational view of the manual controls for the transmission, the housing for such controls being partly removed to show their disposition in the transmission.

The manual controls are shown to better advantage in Figs. 1, 2 and 7 to which reference is now made.

The slidable member 54 of clutch 51 is provided with a groove 56 in which is disposed an oscillatable shift fork 57, and similarly, the slidable member 55 of clutch 52 is provided with a groove 58 in which rides an oscillatable shift fork 59. Shift fork 57 has an extension 60 formed thereon on the end of which is mounted a roller 61, and shift fork 59 has a similar extension 62 on the end of which is mounted a roller 63. Rollers 61 and 63 cooperate with a plate cam 64 formed integrally with a gear 65 mounted on a stub shaft 66 journaled in the side of housing 20. Rollers 61 and 63 are disposed on opposite sides of shaft 66 and are urged toward cam 64 by a tension spring 67 the ends of which are hooked around extensions 60 and 62 on shift forks 57 and 59. Cam 64 is so shaped that in one position, rollers 61 and 63 are held apart in a position corresponding to a released condition of clutches 51 and 52; in a second position, rollers 61 and 63 are allowed to move toward stub shaft 66 a distance corresponding to an engaged condition of clutches 51 and 52; and in a third position, roller 63 is allowed to approach shaft 66 corresponding to an engaged condition of clutch 52 while roller 61 is maintained at its remote position relative to shaft 66 corresponding to a disengaged condition of clutch 51. The first position is effected for neutral and reverse settings of the transmission, the second position is effected for forward drive through the transmission in all of the speeds available in the transmission, and the third position is effected when it is desired to lock up over-running clutch 44 for a second speed lock up drive through the transmission.

Figure 4:
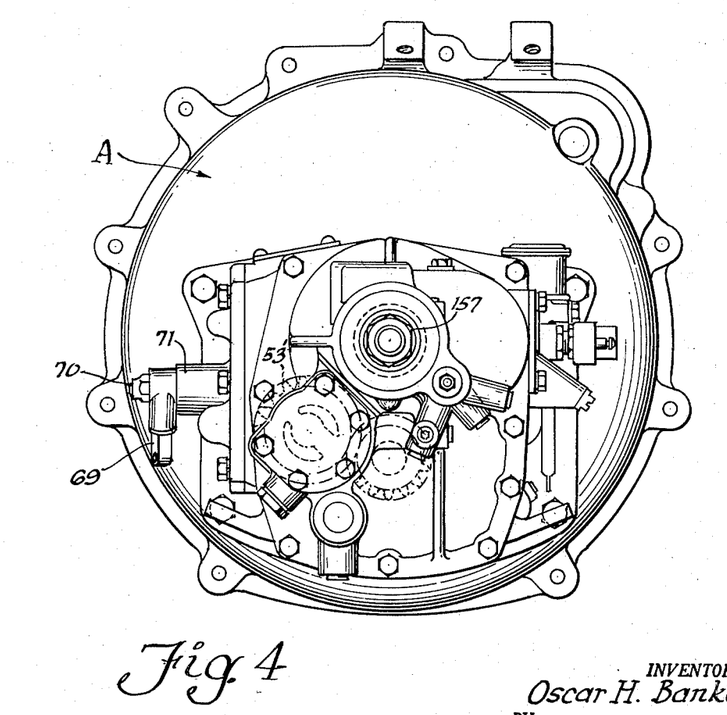
Fig. 4 is a rear elevational view of the transmission.

The coordinated movements of the clutches described above is brought about by the movement of an external control preferably located at the steering wheel of the vehicle (not shown) and connected by a flexible Bowden wire cable to a lever 69 disposed externally of transmission housing 20 and secured to drive a rock shaft 70 mounted in a boss 71 (Figs. 2 and 4) formed on the side of housing 20. Rock shaft 70 extends into housing 20 and is connected to drive a gear 72 which meshes with gear 65 for driving cam 64. Said gear 72 also meshes with a gear 73 to which is connected an arm 74 cooperating with a shift fork 75 slidable on a rod 76, disposed with its axis parallel to the axis of rotation of shafts 24 and 27, and engaging gear 50. Also mounted on rod 76 is a shift fork 77 which engages shift collar 46 for clutch 45 whereby to engage and disengage said clutch 45 to lock up or liberate one-way clutch 44.

Shift fork 77 is operated by a bell crank 78 having a roller 79 mounted on the end of one arm 80 thereof. Roller 79 engages a cam 81, shown partly in dotted outline in Fig. 7, mounted for rotation with shaft 70 and so disposed and shaped as to hold clutch 45 in disengaged position when lever 69 is moved to positions corresponding to reverse, neutral and forward drives for the transmission, and to permit clutch 45 to engage when lever 69 assumes a position corresponding to the second speed lock-up position for the transmission.

It will be apparent from Fig. 7 that because of the intermeshed relation between gears 65, 72 and 73, rotation or oscillation of gear 72 will compel rotation or oscillation of gears 65 and 73 in timed relation therewith, and that therefore the manipulation of lever 69 results also in the coordinated shifting of clutches 51, 52 and 45, and of gear 50 to produce, or to permit the production of, the available ratios through the transmission as well as a neutral condition. A spring 82 compressed between an abutment on rod 76 and shift fork 77 continually urges said shift fork 77 to the left corresponding to an engaged position of second speed lockup clutch 45.

It may be observed that clutches 45, 51 and 52 are spring-engaged and released by cams. No power is therefore required to effect the engagement of any of the clutches or shiftable devices in the transmission section B with the exception of gear 50 which is manually operated.

The automatic clutch and brake

The description of the mechanisms in section A will now be given.

The connection between shaft 24 and crankshaft 25 as stated previously is effected by means of an automatically operable friction clutch disposed within section A. This clutch, and a friction brake used to reduce the shifting time of the clutches 51 and 52 in section B, are the principal mechanisms in section A.

Crank shaft 25 terminates in a flange 83 to which is secured a fly wheel 84 having the usual starter ring gear 85 mounted on the rim thereof. The rear face 86 of fly wheel 84 is annular in shape and constitutes one of the driving friction faces of the clutch. Secured to fly wheel 84 is a clutch housing 87 having two cylindrical sections 88 and 89 of different diameters joined by a shoulder 90, and an attaching flange 91 by which the housing 87 is secured to face 86 of fly wheel 84 as aforesaid.

A clutch pressure plate 92, annular in form, is disposed within cylindrical section 89 and is provided with a friction face 93 parallel with, and spaced from, friction face 86 on fly wheel 84. Cylindrical section 89 has openings 95 formed therein at equidistantly spaced intervals circumferentially of the section through which extend lugs 96 formed integrally with pressure plate 92 and by which said pressure plate 92 is driven from housing 87 and fly wheel 84. Also equidistantly spaced around the periphery of section 89 are inwardly bent tabs 97 having openings therein through which extend studs 98, said studs being secured to pressure plate 92 by pins 99 passing through the pressure plate and through the left-hand end of studs 98. The particular fastening means used to secure the studs 98 to pressure plate 92 is not material to this invention and may be varied to suit the production facilities of the manufacturer. It is required only that studs 98 move with pressure plate 92.

The right-hand end of each stud 98, as viewed in Fig. 1, is threaded to receive a nut 100 which is used to retain and compress a spring 101 between inwardly bent tab 97 and a washer 102 encircling stud 98. It may be observed that spring 101 is so disposed that it will normally tend to urge stud 98 and the pressure plate 92 to the right, as viewed in Fig. 1, away from face 86 of fly wheel 84. An opening 103 is provided in shoulder 90 to permit such movement of stud 98, and also to facilitate assembly of the nut 100, spring 101 and washer 102 on stud 98.

Fly wheel 84 and pressure plate 92 constitute the driving elements of the friction clutch. The driven element is comprised of a disc 104 having friction facings 105 on opposite sides thereof of annular form and adapted to cooperate with friction faces 93 and 86 to receive a drive therefrom. Disc 104 is connected through a torsional vibration dampener 106 to the clutch hub 107 mounted on axially disposed splines 108 formed in shaft 24. Said splines 108 permit slight axial movement of hub 107 relative to shaft 24 to permit the disc 104 to align itself with faces 93 and 86.

Thus, as pressure plate 92 may be urged to the left by a suitable force, facings 105 will be engaged by friction faces 93 and 86, and the frictional force developed by the pressure of plate 92 will be sufficient to drive facings 105 and the associated disc 104 with fly wheel 84, the rotation of disc 104 then being transmitted through torsional vibration dampener 106 and hub 107 to shaft 24 through the splines 108.

Since springs 101 are so disposed as to urge pressure plate 92 to the right as viewed in Fig. 1, they constitute the releasing force for the clutch. The engaging force for the clutch is developed by the rotation of fly wheel 84 above the idling speed of the associated engine. The specific means by which the engaging force is developed and transmitted to the pressure plate comprises a plurality of levers 109 disposed radially of pressure plate 92 and provided with a fulcrum 110 formed in the shoulder 90 of clutch housing 87. Said fulcrum 110 is somewhat rounded and fits into a socket 111 formed in lever 109. The portion of lever 109 extending radially outwardly of socket 111 is provided with a weight 112 which extends through opening 95 in cylindrical section 89 and is thereby constrained to rotate with housing 87. Radially inwardly of socket 111 is a rise 113 which rides on the surface 114 of a hardened insert 115 secured to pressure plate 92. The pressure of springs 101 against washers 102 and nuts 100 on studs 98 causes surfaces 114 to bear continuously against rises 113 on levers 109, which causes levers 109 to rotate in a counterclockwise direction about fulcrums 110 and thereby to urge said levers to a released position relative to pressure plate 92.

It may be observed that weights 112 on levers 109 are axially displaced relative to fulcrums 110. Upon rotation of crankshaft 25 and the associated fly wheel 84 and clutch housing 87, levers 109 with their weights 112 will be likewise rotated, and the centrifugal force developed in weights 112 by such rotation will tend to cause levers 109 to be rotated in a clockwise direction as viewed in Fig. 1 relative to fulcrums 110 which, in turn, results in a movement to the left of rise 113 and a corresponding leftward movement of hardened insert 115 and pressure plate 92 to compress the clutch facings 105 between surfaces 93 and 86. This clockwise rotation is resisted initially by springs 101, but upon the attainment of a predetermined speed of rotation by clutch housing 87 and weights 112 driven thereby, the resisting force of springs 101 is overcome and engagement of the clutch results. This effects a drive from crankshaft 25 to shaft 24 in section B containing the gearing as aforesaid. The speed at which engagement will take place may be regulated by the spring pressure developed in springs 101 which in turn is regulated by nuts 100. It is also regulated by an exterior control which will be described hereinafter. As stated previously, the engagement of the clutch is designed to take place above the normal idling speeds of the engine of which crank shaft 25 is a part.

One of the less desirable characteristics of a centrifugally operated clutch is the automatic disengagement of the clutch each time the speed of the centrifugal weights of the clutch is reduced to a predetermined number of revolutions per minute. In a change speed transmission of the step type, the engine speed may be brought down below the speed at which engagement of the clutch occurs each time a shift is made, or while the vehicle in which the transmission is installed is driven in a higher ratio but at a low vehicle speed. This may result in a prolonged operation of the clutch in a condition of incomplete engagement wherein excessive slip occurs which develops destructive wear and heat in the clutch facings.

Figure 3:
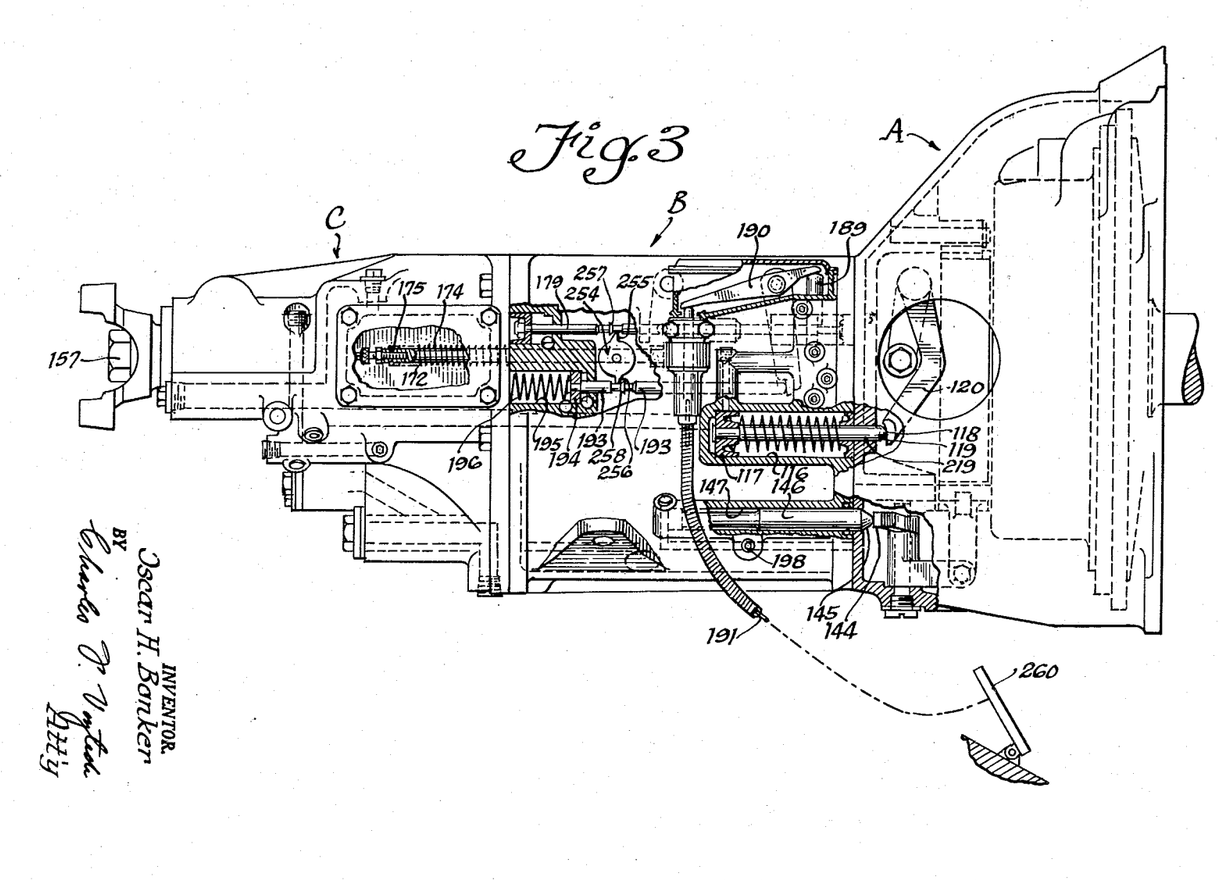
Fig. 3 is an elevational view of the side of the transmission opposite the side shown in Fig. 1, said opposite view being partially in section to show further details of the controls.

The foregoing less desirable characteristic is eliminated in the present transmission by the provision of means for automatically supplanting the force developed by the centrifugal weights 112 with a fluid pressure force developed by the rotation of driven shaft 27. The following are the means by which this fluid force is impressed upon pressure plate 92:

As shown in Figs. 1 and 3, section B includes a cylinder 116 in which reciprocates a piston 117, the axis of which is disposed substantially parallel with the axis of shaft 24. The end 118 of piston rod 219 extends into section A into contact with the end 119 of a lever 120. Said lever 120 is mounted on a shaft 121 disposed above shaft 24 and extending transversely of the axis of that shaft. A yoke 122 axially spaced from lever 120 on shaft 121, but preferably made integral therewith, has its free ends riding in the groove 123 of a sleeve 124. Said sleeve 124, in turn, is supported by a tube 125 extending to the left, as viewed in Fig. 1, from a plate 126 secured to the housing 127 for section A. Thus, as piston 117 reciprocates in its cylinder 116, piston rod end 118 will contact lever 120 to oscillate the lever about its shaft 121 which, in turn, will cause yoke 122 to reciprocate sleeve 124 on tube 125.

The left hand end of sleeve 124 is belled as at 128 to receive an anti-friction bearing 129, the inner race of which supports a sleeve 130. The left hand end of sleeve 130 is formed with a groove 131 in which are received the radially inner ends of levers 109. Relative axial movement between bearing 129 and sleeves 124 and 130 is prevented by suitable abutments and snap rings on said sleeves.

It may be apparent that the axial reciprocations of sleeve 124 are transmitted directly to the inner ends of levers 109 and that therefore the position of said levers may be controlled by the position of sleeve 124. Thus, if it is desired to maintain levers 109 in a position corresponding to an engaged condition of the clutch irrespective of the speed of the clutch, it is only necessary to introduce fluid under pressure behind piston 117 until the desired position of levers 109 is attained. The disengagement of the clutch is effected as before by the operation of springs 101 which also serve to introduce a constant pressure upon the parts between pressure plate 92 and piston end 119 to prevent them from rattling.

The engine speed at which the clutch in section A will engage would normally depend upon the releasing force developed by springs 101. Operating conditions for an engine vary, however, from season to season so that in warm weather a relatively low idling speed may be entirely satisfactory, whereas in cold weather, a relatively high idling speed may be necessary to maintain satisfactory operation of the engine during its "warm up" period. Furthermore, automatic chokes now commonly supplied as standard equipment with automotive vehicles produce a high or "fast" idling speed for varied periods upon starting an engine, depending upon its temperature conditions, and the operator has no control over such chokes, so that if the "fast" idle dictated by the automatic choke is higher than the speed at which the clutch is set to engage, it may be difficult, if not impossible, to shift the herein described transmission into forward or reverse drives.

Figures 5, 10:
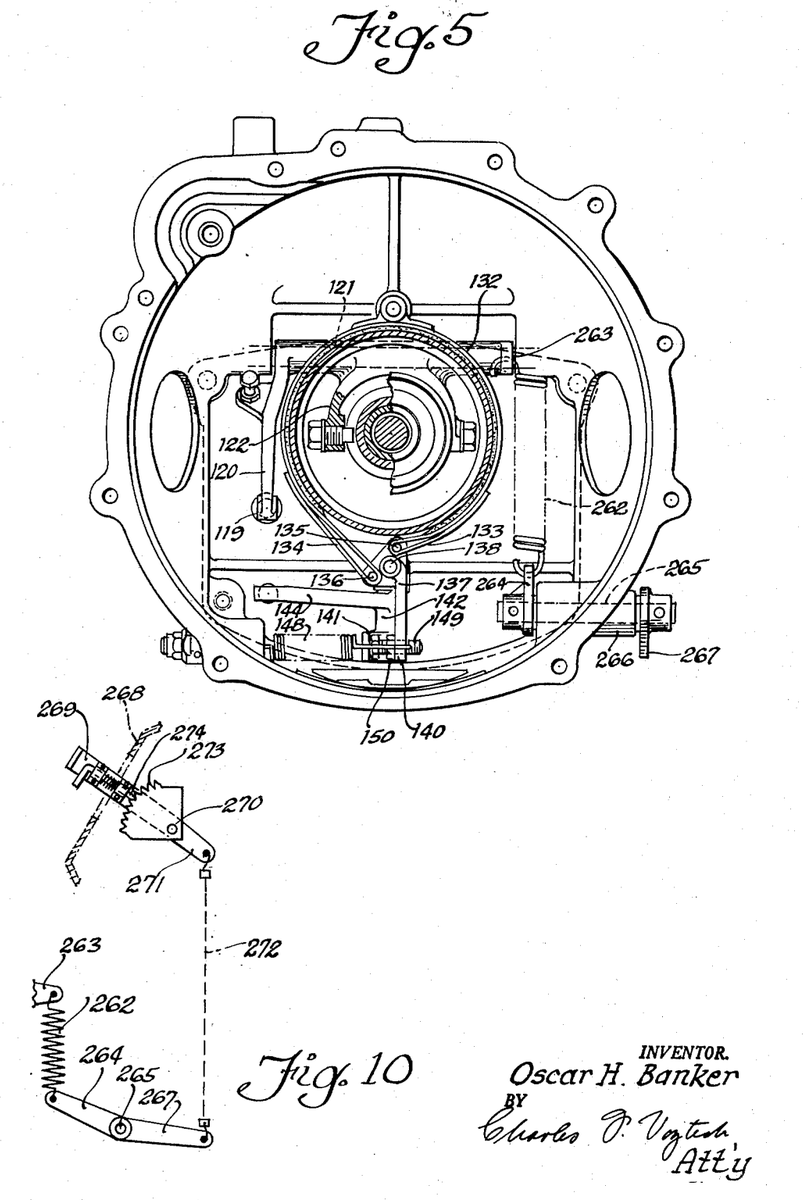
Fig. 5 is a front elevational view of the engine clutch housing with the clutch removed, showing the details of the brake operating mechanism.
Fig. 10 is a fragmentary side elevational view of the manual control for the engaging speed of the centrifugally operable clutch of the transmission of Fig. 1.
Figure 6:
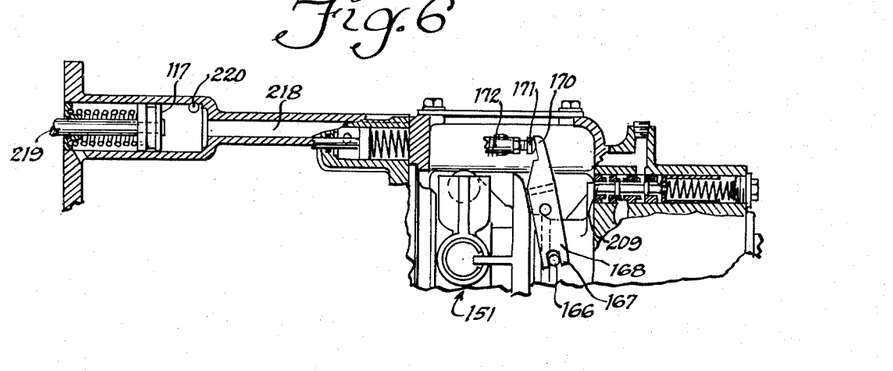
Fig. 6 is an enlarged fragmentary section through certain manual controls for the engine clutch.

To provide a driver-operated control for the idling speed of the engine clutch, a manually controlled spring is provided which acts to augment the force of release springs 101. This spring is shown in Figs. 5 and 10 at 262 and has one end connected to an arm 263 rigidly connected to clutch shift yoke 122 so as to be movable therewith. The other end is connected to a lever 264 secured to the inner end of a rock shaft 265 pivoted in and passing through a transverse boss 266 in housing 127. The outer end of shaft 265 is connected to an external control lever 267.

At the dash or cowl 268 of the vehicle is mounted a manually operated force multiplying control lever 269 which is pivoted at 270 and has an arm 271 connected through any suitable linkage 272 to arm 267. Thus, oscillation of manually operated control lever 269 about pivot 270 causes an oscillation of levers 267 and 264, thereby exerting varying tensioning forces on spring 262. This, in turn, results in impressing varying augmenting forces upon release springs 101 thereby making it necessary to rotate the clutch weights 112 at higher speeds to develop sufficient force to engage the clutch. The control may be set at any desired force by the provision of a ratchet 273 and a hand-operated pawl 274 located on control lever 269.

When it is desired that the engine clutch shall engage at a high engine speed, lever 269 is moved downward and locked in position by pawl 274; and when a low engaging speed is desired, lever 269 is moved upward and locked in the position corresponding to the desired low engaging speed.

Since the Maybach type of clutch used in the present transmission can be engaged only upon relative reversal of drive between the clutch members it is necessary to bring the speed of shaft 24 down until such relative reversal of drive takes place in the clutch to be operated. This slowing down can be effected merely by closing the throttle of the engine and waiting until the speed of the shaft 25 drops down to the desired speed because of the compression of the engine and friction losses. Where a considerable mass is secured to, or incorporated in, the clutch of the engine, however, an appreciable amount of time might be required in which the compression and friction loss may be effective to slow down drive shaft 24 to the desired extent. This slowing down time is reduced in the present transmission by providing a brake in section A which operates upon reduced cylindrical section 88 of clutch housing 87. Thus, the outer surface of this reduced cylindrical section 88 forms the drum element of a brake around which is wrapped a brake band 132 (Fig. 5) the ends 133 and 134 of which are wrapped around pins 135 and 136 respectively, constituting the operative ends of a toggle lever 137. A pin 138 mounted in a boss 139 (Fig. 1) in housing 127 supports lever 137 for rocking movement thereabout. The free end 140 of toggle lever 137 is continuously urged against one arm 141 of a bell crank 142 which is mounted for oscillation about a pin 143, the axis of which is substantially at right angles to the axis of pin 138. The other arm 144 of bell crank 142 engages the rounded end 145 (Fig. 3) of a piston 146, disposed in a cylinder 147 located in section B. A spring 148 continuously urges the free end 140 of toggle lever 137 against the end of lever arm 141, suitable adjusting means being provided intermediate end 140 and arm 141 to insure a desired operation of the brake. Said adjusting means may comprise a bolt 149 operating in a threaded opening in the end 140 of lever 137 and locked in place by a lock nut 150.

It may be observed that when piston 146 is urged to the right as viewed in Fig. 3, its motion is transmitted through bell crank 142 to the end 140 of toggle lever 137 which, in turn, will rotate about its pin 138 in a counterclockwise direction as viewed in Fig. 5 to draw the ends 133 and 134 of the band 132 together. This will cause the band 132 to engage the outer surface of cylindrical section 88, and since the band is secured against rotation, the rotation of cylindrical section 88 and all the parts associated therewith including driven discs 104 and shaft 24 will be retarded.

*The governor*

The automatic operations of the transmission are initiated by a governor which is driven from shaft 27 and is located in section C. As shown in Figs. 1 and 2, the governor body is comprised of a cruciform casting 151 mounted on a reduced diameter portion 152 of shaft 27, the cruciform being given the governor body by radially disposed tubular sections 153 arranged with their axes substantially 90 degrees apart. The body 151 is fixed against rotation relative to shaft 27 by a sleeve 154, the left-hand end of which abuts on the governor body 151. Sleeve 154 is held against governor body 151 by a speedometer drive gear 155 abutting on the right hand end thereof and the hub 156 of the driving member of a universal joint which abuts on gear 155. The various abutting elements are urged to the left against the inner race of bearing 30 by a nut 157 threaded on the right hand end, as viewed in Fig. 1, of shaft 27 and bearing against a washer 158 which in turn bears against the end of hub 156. The frictional force developed by the pressure exerted by nut 157 is sufficient to insure rotation of governor body 151 with shaft 27.

Within the tubular sections 153 of the governor body 151 are disposed governor balls 159, said balls being retained within the tubular sections by snap rings 160, located in the outer ends of the tubular sections. Each tubular section has a slot 161 in the right hand side thereof, as viewed in Fig. 1, into which projects the cam 162 of the movable element 163 of the governor. The cam surface 164 of each cam 162 extends into the path of movement of the governor balls 159 as they tend to fly radially outwardly under the influence of centrifugal force developed by the rotation of governor body 151. The contour of cam surfaces 164 may be varied to suit requirements of the mechanism to be controlled by the governor, but in the present instance, said cam surfaces 164 are flat planes disposed substantially at 45 degrees with respect to the axis of rotation of the governor body.

It may be observed that as the balls 159 tend to move radially outwardly under centrifugal force they will bear against cam surfaces 164 and will tend to move the movable element 163 of the governor to the right, as viewed in Fig. 1.

The radial distance that cam surfaces 164 project into tubular sections 153 is such that at substantially the extreme left-hand position of the movable element 163, balls 159 bottom in tubular sections 153 to prevent rattling of the balls at low speeds.

Movable element 163 is continually urged to the left, as viewed in Figs. 1 and 2, by an axially slidable collar 165 mounted on sleeve 154 and bearing against the end of movable element 163. Said collar does not rotate and is provided with radially extending pins 166 received within the forked ends 167 of a pivoted yoke 168, the pivot for which is shown at 169. The opposite end 170 of yoke 168 is engaged by the adjustable end 171 of a push rod 172 axially slidable in a long boss 173 (Fig. 2) formed in housing 20. A spring 174 (Fig. 3) compressed between an abutment 175 on rod 172 and the end of boss 173 continually urges end 170 of yoke 168 to the right, as viewed in Figs. 1 and 2, which results in movement of forked ends 167 to the left to urge movable member 163 in that direction and thus to oppose the outward movement of balls 159. Collar 165 has formed thereon a finger 176 which extends radially outwardly into contact with one end of a governor controlled valve 177, which is mounted in a boss 178, formed in the housing for section C.

The hydraulic controls

It is assumed for purposes of illustration that the transmission herein disclosed is to be used in an automotive vehicle equipped with the usual foot throttle, and that the transmission can be operated in such a way that in an emergency, the depression of the foot throttle to the limit of its movement in that direction will automatically effect a shift in the transmission from the ratio then in effect to the next numerically higher ratio in order to make available to the operator of the vehicle the greater acceleration provided by that ratio. The hydraulic controls for effecting such operation as well as the other normal upshifting functions will now be described.

Clutch 52 is designed to be forcibly released under certain conditions, and its operation therefore is controlled through shift fork 59 by hydraulic means shown in Fig. 2. This hydraulic means is comprised of a piston rod 179 which is reciprocable in a direction generally parallel with the axis of rotation of shaft 27 and extends across section B from end to end. In the left-hand end of section B, which for convenience will be called the front end, is formed a cylinder 180 in which is disposed a piston 181 rigidly secured to the left-hand end, as viewed in Fig. 2, of piston rod 179. In the right-hand end of section B is formed a cylinder 182 in which is disposed a piston 183 rigidly secured to the other end of piston rod 179. A compression spring 184 in cylinder 180 constantly urges piston 181 to the left.

Contact between piston rod 179 and shift fork 59 is established through a collar 185 mounted on piston rod 179 and axially slidable thereon to a limited extent, the right-hand end of collar 185 bearing against a pin 186 formed on shift fork 59 and extending into the path of movement of collar 185. Movement of collar 185 to the right as viewed in Fig. 2, is limited by a snap ring 187, shown more clearly in Fig. 8, mounted on rod 179, and movement to the left is limited by a compression spring 188, which is compressed between piston 181 and the left-hand end of collar 185. Thus, if piston 181 is urged to the right, as shown in Fig. 2, to disengage clutch 52 and at that time the clutch is transmitting considerable torque so that the force exerted by piston 181 is not sufficient to release the clutch, piston 181 may nevertheless move to the right and compress spring 188 to store the releasing energy therein. Upon a reduction in the torque transmitted by clutch 52 to an amount which produces less force than is stored in spring 188, collar 185 will then be slid to the right until it strikes snap ring 187 and during this movement will oscillate fork 59 to its clutch released position.

Figure 8:
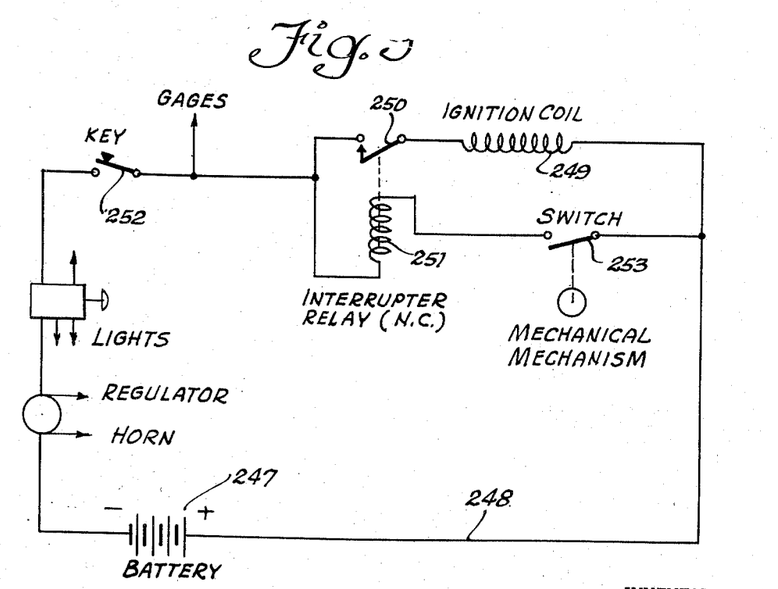
Fig. 8 is a diagram of the hydraulic circuit for the transmission including the valves and pistons used therein.

Referring to Figs. 3 and 8, the hydraulic controls also include a throttle valve 189 mounted on the transmission on the side of section B thereof and operated by a rocker arm 190 which, in turn, is operated by a Bowden wire 191 connected to a throttle pedal 260.

As stated previously, clutches 51 and 52 are designed to be spring engaged, both clutches being served by the same spring 67. Clutch 51, however, is also subject to the operation of an over-control which acts to restrain the force of spring 67 tending to engage it, said over-control comprising, as shown in Figs. 3 and 8, a piston rod 193 connected at its right-hand end to a piston 194 operating in a cylinder 195 formed in the housing of section B near the rear face thereof. A compression spring 196 in cylinder 195 normally urges piston 194 to the left (Fig. 8) so that the end 197 thereof in contact with shift fork 57 tends to oscillate said fork 57 clockwise to a position corresponding to the disengaged position of slidable member 54 of clutch 51. The greater force exerted by spring 196, as compared to the force of spring 67 is at times overcome by fluid pressure acting upon the opposite side of piston 194 in a manner hereinafter to be described.

Another control provided in the fluid system is a valve which is operated when the second speed lockup clutch 45 is engaged. This valve is mounted transversely of the transmission and is shown in end elevation in Fig. 3 at 198 and in longitudinal cross section in Fig. 8. It is axially slidable in a valve bore 199 and is urged to the right, as viewed in Fig. 8, by a spring 200. The right-hand end 201 of the valve is chamfered and engages the correspondingly chamfered end 202 of shift fork 77 for the second speed lockup clutch 45. Thus, when shift fork 77 is moved to the left, as viewed in Fig. 7, to engage second speed lockup clutch 45, the chamfered end 202 of said fork moves crosswise of the axis of valve 198 in the direction of the arrow in Fig. 8, and this movement is translated into a movement to the left of said valve against the action of spring 200. Such movement shifts a fluid-conducting groove 203 in the valve out of registry with a port 204 in the valve body 205 and brings into registry therewith a vent groove 206 which dumps the pressure in the fork 204 along a longitudinal groove 246 in the valve.

Considering now the details of governor valve 177, it may be observed from Figs. 2 and 8 that the valve is comprised of a bore 207 in a portion of which is mounted a liner 208 and an axially slidable valve 209. Liner 208 is provided with an intake port 210 connected through a check valve 275 to the pressure side of pump 53, and two outlet ports 211 and 212. A spring 276 normally urges valve 209 to the left, as viewed in Fig. 8, against finger 176 on governor collar 165. A circular groove 214 on valve 209 directs the fluid from inlet port 210 to outlet ports 211 or 212, or to neither one, in accordance with the position of the valve. Port 212 is vented through the central bore of the valve around the right-hand end of the said valve as viewed in Fig. 8.

Said valve 209 is shown in Fig. 8 in its low speed position, which also corresponds to its "at rest" position. In this position, fluid under pressure is conducted from port 210 through groove 214 to outlet port 211, which, in turn, is connected by a conduit shown schematically at 215 to the left-hand side of piston 183. With fluid pressure to the left of piston 183, the latter is moved to the right and rod 179 and collar 185 are pulled to the right with it against shift fork pin 186 to rotate the fork to the released position of clutch 52. This condition occurs, however, only when fluid pressure is available from pump 53, and the operation of pump 53 is dependent upon the rotation of gear 35 which drives the pump drive shaft 259. It will be recalled that gear 35 is rotated when the transmission is in neutral with the engine running above idling speed so that fluid pressure is made available before the vehicle is in motion by operating the transmission in neutral at high engine speed for a short time and then dropping the speed to idling speed just before shifting the transmission to "forward." The fluid pressure thus built up is maintained by check valve 275. After the shift to "forward," the engine speed is again increased above idle and the vehicle begins to move. With the movement of the vehicle, pump 53 is rotated and maintains pressure in the system. Upon an increase in the speed of the vehicle to a predetermined value, shaft 152 will rotate the governor at a speed which will cause the finger 176 to move valve 209 to the right to a position wherein groove 214 is no longer aligned with intake port 210 and outlet port 211 and outlet port 211 is vented through the front portion of valve 209. This dumps the pressure behind piston 183 and allows spring 184 to move piston 181 and rod 179 to the left and thereby free the slidable member of clutch 52 for engagement of the clutch. As stated previously, this engagement will take place when the driving member of the clutch reduces its speed below that of the driven element thereof. At this stage, the right-hand end of valve 209 strikes the end of a cup 277 slidable in bore 207 and held against liner 208 by a spring 213. This closes the end of the valve 209 and seals the bore from the pressure in port 212 to prevent venting thereof.

Upon a still further increase in the speed of shaft 152, finger 176 will move valve 209 and cup 277 to their extreme right-hand position wherein groove 214 will be aligned with intake port 210 and outlet port 212. Said outlet port 212 is connected through a schematically shown conduit 216 to the left side of piston 194 and will cause said piston to move to the right against the action of spring 196 beyond an outlet port 217 formed in cylinder 195. The movement of piston 194 to the right causes rod 193 to move to the right likewise, and frees fork 57 for a similar movement under the action of spring 67 to permit clutch 51 to engage when the driving element thereof reduces its speed below that of the driven element thereof.

Outlet port 217 is connected by a conduit shown schematically at 218 to the right-hand side of piston 117 to move it and its associated piston rod 219 to the left, this movement serving to operate lever 120 to lock the friction clutch in engagement as described above.

The movement of piston 117 to the left (Fig. 8) uncovers an outlet port 220 which conducts fluid under pressure through a schematically shown conduit 221 to the intake port 222 of throttle valve 189. Said valve is provided with a liner 223 having an intake port 224 aligned with valve body intake port 222, two outlet ports 225 and 226, and two vent ports 227 and 228. Valve 189 has an upper circular groove 229 and a lower circular groove 230. The valve is shown in the position it occupies when the throttle pedal is released, that is, in its uppermost position. In this position, fluid is conducted from intake port 224 through groove 230 to outlet port 226, which is in communication with a schematically depicted conduit 231 conducting the fluid under pressure to the intake port 232 of a follower valve the movable element 233 of which is in contact with shift fork 57. A spring 234 located in the bore of movable element 233 continually urges said element against fork 57 to compel the element to move with, i. e. follow, said fork. The follower valve is provided with a second speed lockup valve outlet port 235, a dump port 236 which, however, is connected through conduit 244 to throttle valve 189 and is vented only when the throttle valve 189 is in the position shown in Fig. 8; a kickdown outlet port 237 connected through conduit 243 to the left-hand side of piston 181 and a vent port 238. The movable valve element 233 is provided with a circular groove 239 and a second circular groove 240 which direct the fluid to the several conduits in the manner hereinafter to be described.

When movable element 233 is in the position shown in Fig. 8, groove 239 connects port 232 with port 235 to conduct fluid under pressure through conduit 241 to second speed lockup valve 198. If the second speed lockup clutch is not then engaged, the fluid will be conducted around the valve to a conduit 242 and thence behind piston 146 to operate the brake 132.

The operation of the hydraulic system is as follows:

After the engine is started and the hand selector lever is in the neutral position, the engine can be raced. This action causes pump 53 to build up hydraulic pressure in the system, the pressure being preferably approximately 80 pounds per square inch. This pressure will be created even though the car may be standing still. Before conditioning the transmission for transmitting power in either a forward or a reverse direction relative to shaft 24, the operator reduces the engine speed to idling speed and then moves the direction control lever 69 to either the reverse position or forward position as the case may be. Upon depressing the foot throttle lever 260 (Fig. 3) the vehicle begins to move in the direction selected. If the direction selected is forward, the transmission will always start in the low gear ratio.

Assuming that a forward direction has been selected, pump 53 again begins to build pressure in the fluid system. The transmission is operating in its first, or low, speed, and as the vehicle speed increases, the hydraulic system begins to condition itself to shift the transmission to the next ratio. Although the pump pressure may drop as the engine speed drops to start the car, the pressure beyond check valve 275 remains the same. As the vehicle begins to move, operation of pump 53 builds up the operating pressure to the aforesaid 80 pounds per square inch which is then available through the governor valve 209, outlet port 211, and conduit 215 to piston 183. This, as stated previously, holds clutch 52 in disengaged condition.

As the vehicle speed increases to a selected speed such as 10 miles per hour, valve 209, following the movement of the governor finger 176, reaches a position whereinin the fluid pressure in conduit 215 is dumped, but pressure is blocked from conduit 216. This permits piston 183 to move to the left under the action of spring 184, and clutch 52 is now released and in condition to shift the transmission into second speed. When the operator is ready to effect the shift, he releases the foot throttle pedal 260 which decelerates the engine, and clutch 52 engages just as soon as the condition for such operation occurs as described above. The operator then resumes pressure upon the throttle pedal 260 to depress it and the vehicle speed increases.

When the vehicle attains a speed of say 15 miles per hour, valve 209 is moved by governor finger 176 to the position wherein fluid under pressure is conducted through groove 214 through port 212 to conduit 216. As stated previously, this causes fluid under pressure to be conducted to the left-hand side of piston 194 to uncover port 217, then through conduit 218 to piston 117 to lock the engine clutch in engaged condition, then through conduit 221 to throttle valve 189.

When the operator is ready to make the next shift, foot throttle pedal 260 is again released, and valve 189 assumes the position shown in Fig. 8 wherein fluid under pressure is conducted through it to and through the follower valve 233, second speed lockup valve 198, and conduit 242 to the brake piston 146. The engine brake operated by piston 146 applies a force to the input side of the transmission which assists in decelerating the engine quickly. Clutch 51 begins to engage and the follower valve 233 moves with shift fork 57 of clutch 51 to vent conduit 235 and release brake 132. The engagement of clutch 51 effects a change in speed ratio from second speed to fourth speed (omitting third speed), fourth speed being the direct drive for the transmission. The throttle pedal may now again be depressed and the vehicle speed increased to the desired cruising speed.

While the vehicle is operating in fourth speed and its velocity is between 15 and 50 miles per hour, the operator can shift the transmission to a lower speed ratio such as the omitted third speed if extra performance is required for the vehicle to pass another vehicle or to take care of some sudden emergency road condition. To make this shift from fourth to third speed the operator depresses the foot throttle pedal 260 to the limit of its movement in this direction, which, in turn, moves throttle control valve 189 downward. In this position of valve 189, hydraulic pressure is transmitted through valve 189 as before, but conduit 231 is vented through port 228 and conduit 244 is connected to conduit 221, thereby introducing fluid under pressure through ports 236 and 237 to conduit 243 connected to the left-hand side of piston 181. This fluid pressure moves piston 181 to the right against the action of spring 184, and the movement of piston 181 is transmitted to collar 185 through a spring 188, it being remembered that collar 185 bears against shift fork pin 186 in a direction to disengage clutch 52. If the force of spring 188 is sufficiently great to overcome the resistance to disengagement produced by the interengaging teeth of clutch 52, then clutch 52 will be disengaged. However, if torque is being transmitted through clutch 52 at the time of the attempted downshift as is very probably the case due to the depressed position of throttle pedal 260, spring 188 may not be sufficiently strong, and hence collar 185 will simply slide to the left on piston rod 189 to store up energy in said spring 188 until such time as torque is relieved from the teeth of clutch 52. The special means used in this transmission to effect a reduction in torque transmitted under these conditions will be described hereinafter. Upon the disengagement of clutch 52 the transmission is in third speed and will provide the necessary performance for the vehicle. Said vehicle can be operated in third speed under these conditions until the emergency has been alleviated and the operator wishes to shift back into fourth speed. The shift to the fourth speed is effected simply by releasing foot throttle pedal 260 for a period long enough to permit clutch 52 to engage again, whereupon operation in fourth speed is resumed.

Similarly, when the vehicle is operating in second speed and the velocity of the vehicle is above 15 mils per hour, the operator may shift the transmission from second speed back to first speed if he should desire increased performance. This again is done by depressing foot throttle pedal 260 to the limit of its movement in that direction and the same sequence of operation occurs as occurs in the shift from fourth speed to third speed. A shift back into second speed is effected merely by releasing the accelerator pedal and if at the time the vehicle is moving above the speed at which direct drive or fourth speed can be made effective the transmission may be shifted directly from first to fourth speed ratio. This, of course, would involve a shift first of clutch 52 into engagement followed by a shift of clutch 51 into engagement.

No manipulation of the throttle pedal is required when the vehicle is decelerating to a stop. As the vehicle speed drops below 15 miles per hour, the transmission will shift from fourth speed to second speed by virtue of the fact that the mechanical governor will allow governor valve 209 to move to the left to its second speed position. This vents the pressure in conduit 216, removing pressure from the left-hand side of piston 194 as viewed in Fig. 8 and allowing spring 196 to move piston 194, piston rod 193 and shift fork 57 to the left to move clutch 51 to its disengaged position. As the vehicle speed continues to decrease and falls below 8 miles per hour, the transmission will shift from second speed to first speed. This is effected by the movement of governor finger 176 to the left which allows governor valve 177 to assume its extreme left-hand position wherein fluid pressure is applied from pump 53 through conduit 211 to the left-hand side of piston 183. This causes piston 183 to move to the right as viewed in Fig. 8, pulling with it piston rod 179, the attached piston 181 and thence through spring 188 to pull collar 185 to the right also. Since, during deceleration there is no torque load on clutch 52, spring 188 will be amply powerful to overcome the resistance of the movable element of clutch 52 to disengaged position, and the transmission will then be conditioned for low (first) speed operation.

As stated previously, it is undesirable for the automatic controls to shift the transmission to speeds above second speed if the second speed lockup clutch 45 is engaged. Accordingly, when second speed lockup clutch 45 is shifted into engagement, the movement of shift fork 202 causes a corresponding movement of valve 198 to the left as viewed in Fig. 8 by reason of the contacting cam surface 201 on said valve, and fluid pressure in conduit 241 will then be admitted to groove 206 from which it may then pass through longitudinal vent groove 246 back to the sump to relieve the pressure in conduit 241. This prevents a build-up of pressure back through follower valve 233, throttle valve 189, conduit 221 to the clutch piston 117 and the piston 194 which controls the operation of clutch 51. Although sufficient fluid pressure may be present in cylinder 195 to move piston 194 to the edge of port 217, such movement is not sufficient to permit engagement of the clutch, since full engagement is obtained only when piston 194 is moved to the dotted position shown in Fig. 8. Similarly, enough pressure may be exerted to move piston 117 to the left a sufficient distance to open port 220 to allow fluid to drain through conduit 221 and valve 189 as aforesaid, but such movement of piston 117 is not sufficient to cause an engagement of the clutch.

The foregoing transmission and controls are ideally suited for starting an engine by pushing the vehicle in which the engine and transmission are installed. This may be done by rotating lever 69 to its forward position in which cam 64 is rotated to release roller 63 and to permit shift fork 59 to move under the action of spring 67 to shift the slidable member 55 of clutch 52 into its engaged position. Since, in a push start, driven shaft 152 tends to rotate faster than gear 48, the ideal condition for engagement of clutch 52 obtains. With clutch 52 engaged, drive is transmitted from shaft 152 through clutch 52 to gear 48, and then to the meshing gear 42 from which the drive is then transmitted through splines 34 to sleeve 33 to rotate gear 35. This gear, in turn, rotates the reverse idler gear 53 and the pump driven thereby so that fluid pressure immediately becomes available.

When the vehicle speed reaches the speed at which a shift into fourth or direct drive would normally be made, governor finger 176 will move governor valve 177 to admit fluid under pressure into conduit 216, and thence through cylinder 195 to conduit 218 and to the right-hand side of piston 117 which will then be moved to the left to engage the engine clutch in section A as described previously. With this clutch engaged, the engine will be turned over, and when it starts firing, the transmission, being set for direct drive, may then be shifted back to neutral by the operator.

*The electrical controls*

Since clutches 51 and 52 cannot be disengaged while they are transmitting substantial torque, and since it is necessary under certain circumstances forcibly to disconnect one or the other of these clutches while the throttle is depressed in a manner normally to provide a maximum torque from the engine, the present transmission is provided with a means for momentarily interrupting the engine torque by causing the ignition circuit to the engine to be grounded until the clutches 51 or 52 have been disengaged.

The electrical circuit by which the ignition interruption is effected is shown in Fig. 9 and includes a battery or other source of electrical energy 247 which is connected by a lead 248 to the ignition coil 249. The current then passes through a normally closed switch 250 controlled by an interrupter relay 251 and thence through the ignition key 252 back to the battery 247. Relay 251 is connected in shunt with ignition coil 249 through a switch 253 mounted on housing 20 in proximity to piston rods 179 and 193. As shown more clearly in Figs. 2, 3 and 8, switch 253 is operated by an oscillatable cam plate 254 having diametrically opposed fingers 255 and 256 adapted to contact cams 257 and 258, respectively, on piston rods 179 and 193, respectively. The oscillation of cam plate 254 about its center is translated through a suitable plunger 261 into a movement of closing and opening switch 253. Thus, while ends 255 and 256 are off the cams 257 and 258, switch 253 is open and when said ends contact cams 257 and 258, switch 253 is closed.

The location of switch 253 on transmission housing 20 is so selected that the first part of the movement of piston rods 179 and 193 to disengage their respective clutches 52 and 51 is effective to close switch 253. The closing of switch 253 completes the circuit through interrupter relay 251 which in turn pulls up switch 250 to open said switch and thereby interrupt the ignition circuit. With the ignition circuit interrupted, the engine will miss a few explosions which, of course, causes an instantaneous reduction in torque in input shaft 24 and a reversal of the relative direction of drive as between the two members of each of the clutches 51 and 52. During this brief interruption in torque, the clutch then to be disengaged will be free to do so, and movement of rod 179 or 193 to its limiting position in a disengaging direction will cause finger 255 or 256 to fall off its respective cam 257 or 258 to open switch 253 and hence de-energize interrupter relay 251. This restores ignition switch 252 to its normally engaged or closed condition which again completes the circuit through the ignition coil and restores normal operation of the engine.

It is understood that the ignition interruption circuit and means above described comes into play when the transmission is to be forced back from one ratio to the next lower ratio. The operator is not conscious of the ignition interruption since it is done automatically by the operation of the piston rods 179 and 193. It is understood, of course, that each of these rods may act independently, and each rod is provided with clearance on either side of its cam so that when one rod operates to cause its corresponding finger 255 or 256 to ride up on its cam, no obstruction to this movement will be created by the other, non-moving piston rod.

It is understood that the wiring diagram shown in Fig. 9 is purely schematic and that no effort has been made to outline the specific details of each of the electro-mechanical mechanisms depicted therein. The actual location of the parts, with the exception of switch 253 and the fingers 255 and 256 and the cams 257 and 258 is not material to this invention and can be arranged to suit individual requirements.

Since the operation of each of the parts of the transmission have been described in connection with the description of the part itself it is believed no summary of the description of the transmission as a whole is necessary and that such operation can be readily understood from the description already given.

It is understood that the foregoing description is merely illustrative of a preferred embodiment of this invention and that the scope of the invention, therefore, is not to be limited thereto, but is to be determined by the appended claims.

I claim:

1. In combination, a change speed transmission having input and output shafts, means for establishing a plurality of speed ratios between the shafts, means for conditioning the transmission for operation at a predetermined speed ratio, means responsive to the speed of one of the shafts for controlling the operation of the conditioning means, an engine clutch connected to the input shaft, centrifugally operated levers for controlling the operation of the clutch, and means operated by the conditioning means upon the conditioning of the transmission for operation at said predetermined speed ratio between the shafts for holding the levers in positions corresponding to an engaged condition of the clutch.

2. In combination a change speed transmission having input and output shafts, means for establishing a plurality of speed ratios between the shafts, means for conditioning the transmission for operation at a predetermined speed ratio, means responsive to the speed of one of the shafts for controlling the operation of the conditioning means, an engine clutch connected to the input shaft, centrifugally operated levers for controlling the operation of the clutch, resilient means biasing the levers to disengage the clutch, manually operated means for regulating the force exerted by the resilient means, and means operated by the conditioning means upon the conditioning of the transmission for operation at said predetermined speed ratio between the shafts for holding the levers in positions corresponding to an engaged condition of the clutch.

3. In combination, a change speed transmission having input and output shafts, means for establishing a plurality of speed ratios between the shafts, means for conditioning the transmission for operation at a predetermined speed ratio, means responsive to the speed of one of the shafts for controlling the operation of the conditioning means, an engine clutch connected to the input shaft, radially disposed centrifugally operated levers for controlling the operation of the clutch, an axially slidable collar having a groove to receive the radially inwardly disposed ends of the levers, means including a spring acting upon the collar to slide the collar in a direction to oppose the centrifugal force acting upon the levers, and means operated by the conditioning means upon the conditioning of the transmission for operation at said predetermined speed ratio between the shafts for holding the collar in a position corresponding to an engaged condition of the clutch.

4. In combination, a change speed transmission having input and output shafts, means for establishing a plurality of speed ratios between the shafts, means for conditioning the transmission for operation at a predetermined speed ratio, means responsive to the speed of one of the shafts for controlling the operation of the conditioning means, an engine clutch connected to the input shaft, radially disposed centrifugally operated levers for controlling the operation of the clutch, an axially slidable collar having one groove to receive the radially inwardly disposed ends of the levers and a second groove, a bell crank having a first arm riding in the second groove, a second arm, resilient means acting upon the second arm in a direction to cause the collar to oppose the centrifugal force developed by the levers, and a third arm, and means operated by the conditioning means upon the conditioning of the transmission for operation at said predetermined speed ratio between the shafts and acting upon the third arm in a direction to hold the levers in positions corresponding to an engaged condition of the clutch.

5. A combination as described in claim 4, said resilient means comprising a spring having one end secured to the second arm, a multi-position abutment, and means connecting said abutment to the other end of the spring.

6. A combination as described in claim 4, said resilient means comprising a spring having one end secured to the second arm, a force-multiplying lever having one arm connected to the other end of the spring, and manually operable latch means connected to the force-multiplying lever for controlling the force exerted by the spring.

7. In combination, a change speed transmission including input and output shafts, a countershaft, gearing on the shafts and countershaft adapted to produce drives of different speed ratios between the shafts, means for establishing a drive from the output shaft to one of the countershaft gears through said gearing, an idler gear constantly in mesh with a gear rotatable with the said one of the countershaft gears, an engine clutch connected to the input shaft, fluid operated means for controlling the engagement of the clutch, said fluid operated means including a pump for supplying fluid under pressure to the fluid operated means, and means for driving the pump from the idler gear.

8. In combination, a change speed transmission including input and output shafts, a countershaft, a pair of concentric sleeves on the countershaft, means connecting the sleeves for rotation together, means connecting one of said sleeves to the input shaft, a gear rotatable with each sleeve, an idler gear constantly in mesh with one of said sleeve gears, means adapted to establish a driving connection between the idler gear and the output shaft, a gear on the output shaft in mesh with the other sleeve gear, means for connecting the output shaft gear for rotation with the output shaft, a normally disengaged engine clutch connected to the input shaft, fluid operated means for controlling the engagement of the clutch, said fluid operated means including a pump for supplying fluid under pressure to the fluid operated means, and means for driving the pump from the idler gear.

9. The combination as described in claim 8, and centrifugally operable means controlled by the speed of the engine for engaging the said engine clutch.

10. The combination as described in claim 8, centrifugally operable means controlled by the speed of the engine for engaging the said engine clutch, and manually controlled means for varying the speed at which the engine controlled means becomes effective to engage the clutch.

11. The combination as described in claim 8, the means for connecting the output shaft gear for rotation with the output shaft comprising a one-way engageable jaw clutch the elements of which are adapted to engage when the output shaft tends to rotate faster than the output shaft gear.

12. A transmission for transmitting a drive from a motor to a load, said transmission comprising input and output shafts, change speed gearing adapted to be connected to the shafts to produce drives of different speed ratios between the shafts, a plurality of positively interengageable means for establishing the different drives between the shafts, means for interrupting the operation of the motor including a switch, a pair of parallel rods disposed one on either side of the switch, cams on the rods, means cooperable with the cams and connected to the switch for controlling the operation of the switch, means connecting the rods with the positively interengageable means, and means for urging the rods in a direction to disengage the interengageable means, said cams and means cooperable therewith operating the switch to interrupt the operation of the motor until the disengagement of the drive establishing means is effected.

13. A transmission as described in claim 12, said rods being disposed to move in opposite directions to disengage their respective interengageable means, and said means cooperable with the cams comprising a rotatable plate and a reciprocable follower therefor adapted to convert angular movement into rectilinear movement to operate the switch.

14. A transmission for transmitting a drive from a motor to a load, said transmission comprising input and output shafts, change speed gearing adapted to be connected to the shafts to produce drives of different speed ratios between the shafts, a plurality of positively interengageable means for establishing the different drives between the shafts, resilient means for urging said positively interengageable means into engagement, fluid operated means for urging the positively interengageable means out of engagement, each said fluid operated means including a piston and a piston rod connected to the piston; a sleeve on one rod, a resilient connection between the sleeve and said one rod, said sleeve being connected to the interengageable means, cams on the rods, said interengageable means being operable in opposite directions, means for interrupting the operation of the motor including a switch, said rods being disposed on either side of the switch, and means for connecting the cams to the switch to operate the switch as an incident to the movement of either rod by the fluid operated means, whereby to interrupt the operation of the motor to relieve the positively interengageable means of torque to facilitate disengagement of said means.

15. A transmission as described in claim 14, and means responsive to the speed of rotation of the output shaft for controlling the operation of the fluid operated means.

16. A transmission as described in claim 14, a clutch interposed between the motor and input shaft of the transmission, centrifugally operable means responsive to the speed of rotation of the motor for controlling the engagement of the clutch, hydraulically operable means for engaging the clutch independently of the centrifugally operable means, and a conduit connecting the fluid operated means for disengaging one of the interengageable means with the hydraulically operable means for engaging the clutch, said conduit being opened by the piston in said fluid operated means after the piston has moved in response to fluid pressure.

17. A change speed transmission of the step type including an element shiftable to effect a change in speed ratio through the transmission, resilient means continuously urging the element to effect such change in speed ratio, and means opposing the resilient means, said opposing means comprising a rod, a sleeve on the rod adapted to contact the element, a piston on each end of the rod, a spring compressed between one piston and the sleeve to urge the sleeve against the element, cylinders for the pistons, a second resilient means urging the rod and pistons in the same direction as the first mentioned resilient means, and means for introducing fluid under pressure to the side of one piston to oppose the first and second resilient means.

18. A change speed transmission as described in claim 17, said means for introducing fluid under pressure comprising a normally open shiftable valve, and speed responsive means for shifting the valve to vent the said side of one piston.

19. A change speed transmission as described in claim 17, a second element shiftable to effect another change in speed ratio through the transmission, a third resilient means normally opposing shift of said second element to effect such change in speed ratio, hydraulic means for overcoming the third resilient means, said means for introducing fluid under pressure comprising a normally open valve shiftable to a plurality of positions including a position wherein fluid under pressure is admitted to the hydraulic means for overcoming the third resilient means, and speed responsive means for shifting the valve progressively to its said plurality of positions.

20. A change speed transmission as described in claim 19, and manually controlled means for admitting fluid under pressure to the side of the other piston on the rod to oppose the first and second resilient means after the said valve has been shifted to admit fluid under pressure to the hydraulic means for overcoming the third resilient means.

21. A change speed transmission as described in claim 19, manually controlled means for venting the fluid under pressure in the hydraulic means for overcoming the third resilient means.

22. A change speed transmission as described in claim 19, manually controlled means for venting the fluid under pressure in the hydraulic means for overcoming the third resilient means, and valve means movable in timed relation with the second shiftable element and adapted to admit fluid under pressure to the side of the other piston rod to oppose the first and second resilient means.

23. A change speed transmission as described in claim 19, and further including an input shaft, a clutch adapted to connect the input shaft to an engine, and having driving and driven elements, means responsive to the speed of rotation of the driving element for engaging the clutch, hydraulic means for engaging the clutch, and means for energizing the clutch-engaging hydraulic means upon a predetermined movement of the hydraulic means for overcoming the third resilient means.

24. A change speed transmission as described in claim 19, and further including an input shaft, manually controlled means for venting the fluid under pressure in the hydraulic means for overcoming the third resilient means, valve means movable in timed relation with the second shiftable element and adapted to admit fluid under pressure to the side of the other piston rod to oppose the first and second resilient means, a brake for the input shaft, and hydraulic means for operating the brake, said hydraulic means being controlled by the valve means movable in timed relation with the second shiftable member.

25. A change speed transmission as described in claim 19, and further including an input shaft, a third shiftable element, manually controlled means for venting the fluid under pressure in the hydraulic means for overcoming the third resilient means, valve means movable in timed relation with the second shiftable element and adapted to admit fluid under pressure to the side of the other piston rod to oppose the first and second resilient means, a brake for the input shaft, hydraulic means for operating the brake, said hydraulic means being controlled by the valve means movable in timed relation with the second shiftable member, and a valve operable in timed relation with the shift of the third shiftable element to vent the hydraulic means for operating the brake.

26. A change speed transmission as described in claim 19, and further including an input shaft, a clutch adapted to connect the input shaft to an engine and having driving and driven elements, means responsive to the speed of rotation of the driving element for engaging the clutch, hydraulic means for engaging the clutch, means for energizing the clutch-engaging hydraulic means upon a predetermined movement of the hydraulic means for overcoming the third resilient means, a third shiftable element, manually controlled means for venting the fluid under pressure in the hydraulic means for overcoming the third resilient means, valve means movable in timed relation with the second shiftable element and adapted to admit fluid under pressure to the side of the other piston rod to oppose the first and second resilient means, a brake for the input shaft, hydraulic means for operating the brake, said hydraulic means being controlled by the valve means movable in timed relation with the second shiftable member, and a valve, operable in timed relation with the shift of the third shiftable element to vent the hydraulic means for operating the brake.

27. In combination, a change speed transmission having input and output shafts, means for establishing a plurality of speed ratios between the shafts, means responsive to the speed of one of the shafts for controlling the operation of the means for establishing a plurality of speed ratios, an engine clutch connected to the input shaft, centrifugally controlled means for controlling the operation of the clutch, resilient means for disengaging the clutch, means for rendering the resilient means ineffective to disengage the clutch, and means operable upon the conditioning of the transmission for operation at a predetermined speed ratio between the shafts for energizng the means for rendering the resilient means ineffective to disengage the clutch.

28. A clutch comprising a rotatable driving member having a friction face thereon, a reaction member rotatable with the driving member and having a portion thereof spaced from the driving member, a pressure member disposed in the space between the driving and reaction members and movable toward the driving member, a driven member disposed between the driving and pressure members and adapted to be frictionally engaged by the driving and pressure members, radially disposed levers interposed between the reaction and pressure members and having a pivotal connection with the reaction member, centrifugally operable weights connected to the levers and tending to rotate the levers to cause them to move the pressure member toward the friction face, resilient means acting in opposition to the weights and comprising a spring, means connecting one end of the spring to the levers on the side of the pivotal connection opposite the weights, and manually operable means for controlling the opposing force developed by the resilient means, said manually operable means comprising a force-multiplying lever having one end connected to the other end of the spring, and manually operable latch means connected to the other end of the force-multiplying lever to control the position thereof and thus to control the initial tension in the spring.

References Cited in the file of this patent

UNITED STATES PATENTS

| | | |
|---|---|---|
| 2,237,297 | Banker | Apr. 8, 1941 |
| 2,328,090 | Nutt et al | Aug. 31, 1943 |
| 2,328,091 | Nutt et al | Aug. 31, 1943 |
| 2,422,155 | Wemp | June 10, 1947 |
| 2,427,652 | Banker | Sept. 23, 1947 |
| 2,541,452 | Wemp | Feb. 13, 1951 |
| 2,579,693 | Orr | Dec. 25, 1951 |
| 2,646,864 | Miller et al | July 28, 1953 |